United States Patent [19]

Sirvet

[11] Patent Number: 4,705,158
[45] Date of Patent: Nov. 10, 1987

[54] CUP FEED APPARATUS

[75] Inventor: Enn Sirvet, Washington Township, Bergen County, N.J.

[73] Assignee: Sun Chemical Corporation, New York, N.Y.

[21] Appl. No.: 948,273

[22] Filed: Dec. 31, 1986

[51] Int. Cl.⁴ .............................................. B65G 37/00
[52] U.S. Cl. ............................. 198/463.4; 198/468.11; 221/247
[58] Field of Search ............... 414/724, 15; 198/468.7, 198/468.11, 747, 463.4; 221/267, 250, 247

[56] References Cited

U.S. PATENT DOCUMENTS 2,893,599  8/1959  Kay .................................. 221/267 X
3,584,728  6/1971  Hollenton ......................... 198/463.4
3,677,383  7/1972  Lamb ............................. 198/463.4 X
4,530,446  7/1985  Dixon ............................. 221/267 X Primary Examiner—Robert J. Spar
Assistant Examiner—Donald W. Underwood
Attorney, Agent, or Firm—Mitchell D. Bittman

[57] ABSTRACT

Apparatus which reduces the number of moving parts and the movements required by such parts to enable cups to be transferred rapidly, without damage to cup sheet metal or coating, while controllably feeding cups into a press for redraw. Cups are held in a continuous-feed conveyor collimating means by a stationary element coacting with a longitudinally movable pusher-arm means on the opposite lateral side of the longitudinally directed cup travel path. After release, the cup at the head of the collimated feed line moves both longitudinally of and transversely to the cup travel path along a graded ramp surface, provided by the stationary element, into the control of a pivotally mounted gate means. Release of a cup held by the gate means is controlled by a cam carried by the pusher-arm means and the cup is moved longitudinally along the cup travel path by the pusher-arm means between pivotally-mounted cup-positioning arms which bring the cup into registry for redraw; the pusher-arm means is returned for the next cycle of operation as the cup is positioned in registry for redraw.

6 Claims, 10 Drawing Figures

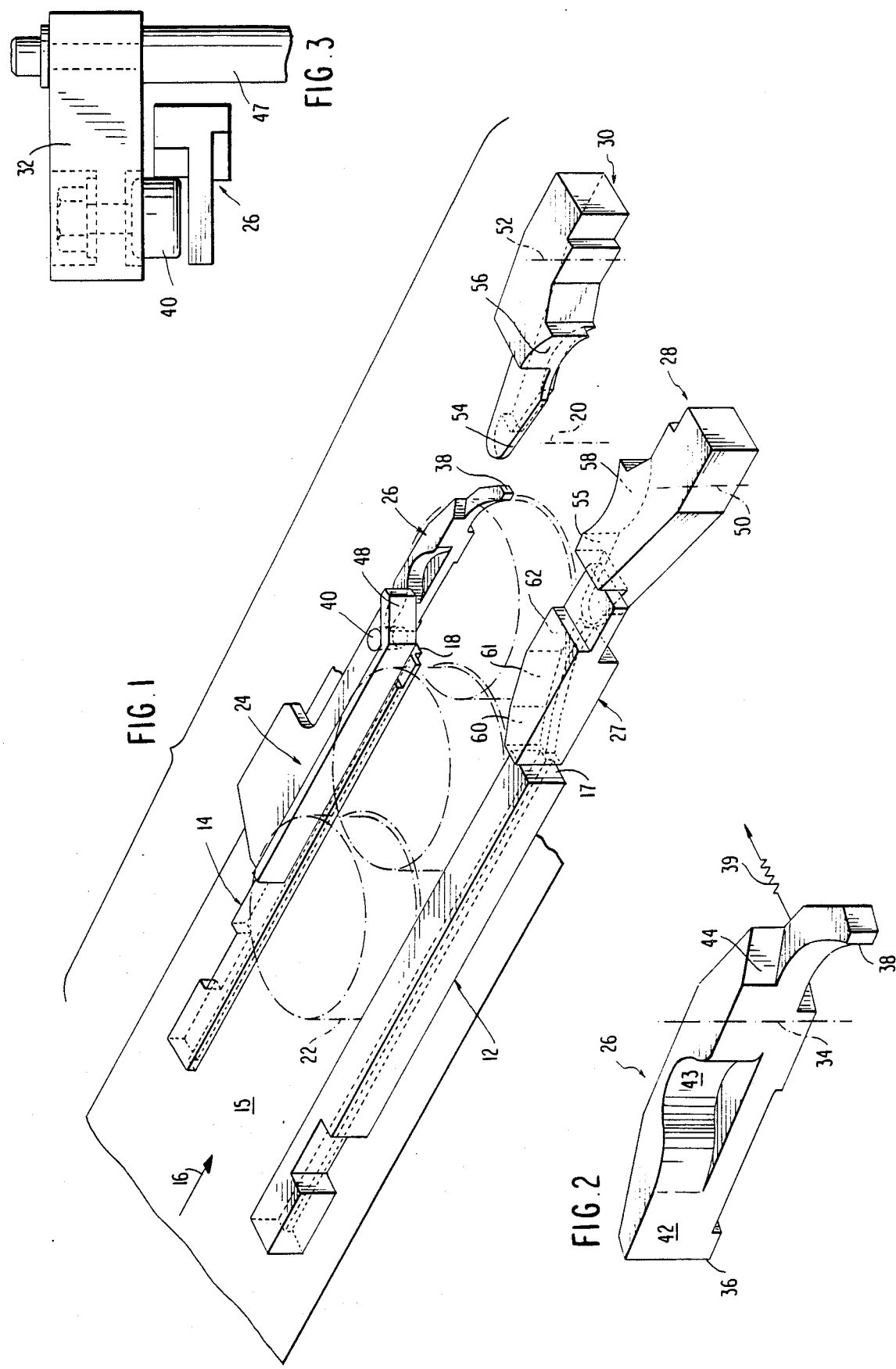

CUP FEED APPARATUS

This invention is concerned with apparatus for transferring metal workpieces in a production line and, more particularly, with minimizing moving parts for providing a fast-acting apparatus for controllably moving sheet metal cups from a supply source and feeding such cups individually into registry in a press for decreasing the diameter and increasing the side wall height of each such cup during fabrication of a one-piece can body.

Conventional devices for transfer of workpieces between presses utilize a longitudinally-oriented carriage with a clamping arm operable from each lateral side of the cup travel path referred to as "box-type" transfer systems (see e.g. Metals Handbook, 8th Ed., Vol. IV Forming, page 12, American Society for Metals, Metals Park, Ohio 44073). The carriage with clamping members oscillate in the longitudinal direction of the processing line between a loading station and the press. The clamping means mounted on the carriage move in a direction transverse to the longitudinal direction for picking up a workpiece by clasping it on its opposite lateral sides and, in conjunction with the carriage move it longitudinally in the forward direction to the press. Upon discharge of the workpiece, the carriage and clamping means return to the loading station for repetition of the cycle. Generally, with a conveyor line feed, a shuttle must also be provided to hold back the cups being conveyed along the line while a cup is being fed into the press and reshaped.

The starting and stopping of a plurality of moving parts and the multi-directional movements required by the box-type transfer apparatus have seriously limited the rate at which individual workpieces can be taken from a feed line and introduced into a press. Thus, the stroke rate of a can body redraw press has been artificially limited by the rate at which cups could be properly introduced into the press. In the past, such box-type transfer systems have limited press operations to about eighty strokes per minute. With the present teachings, directed to limited movement and limiting the number of parts requiring movement, press capacity can be realized and press stroke rates can be increased to twice the previous level, and higher.

The present transfer device for cup-shaped can bodies eliminates the need for moving multiple elements in the longitudinal direction of the feed line. For example, longitudinally stationary elements are utilized (1) in the control of the feed line head (e.g. cups in a continuous-movement magnetic conveyor line), (2) to control release of a single cup, (3) to control transfer of the single cup toward the press, and (4) to control registry of the cup in the press.

The advantages and contributions of the invention, in addition to the increased rate of operation made available, are considered further in describing the embodiment shown in the accompanying drawings, in which:

FIG. 1 is a perspective view of apparatus for controlling movement of cups along a conveyor line and feeding cups individually into registry in a press redraw station in accordance with the invention;

FIG. 2 is an enlarged perspective view of a gating means, forming part of the present invention, with spring action means shown schematically;

Figure 4:
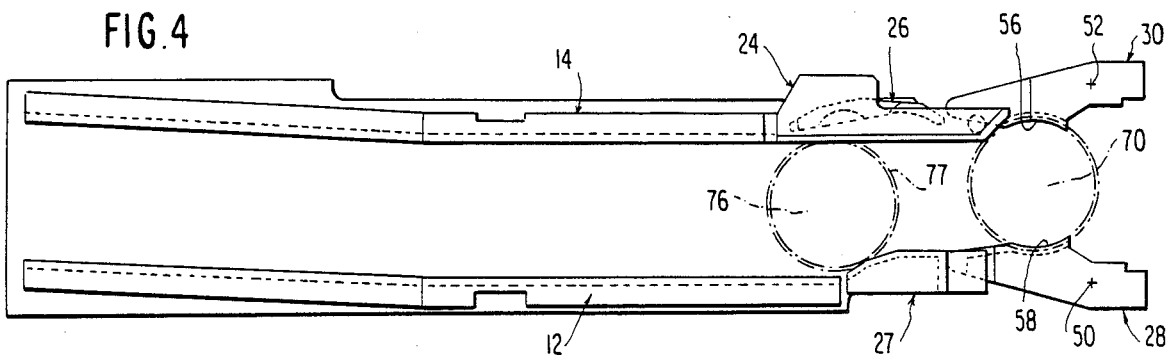

FIG. 3 is an enlarged perspective partial view of selected articulated elements of the invention shown in coacting relationship; and FIGS. 4 through 10 are top plan views, with portions shown in dotted lines, for purposes of presenting sequential stages during functioning of the invention to control cups in a conveyor line, control release and movement of a single cup and to provide desired registry of such cup within a press redraw station.

The side wall of a cup-shaped sheet metal can body, controlled in accordance with the present invention, is sufficiently rigid to enable control of its transfer by acting through its side wall. The side wall is symmetrically disposed with relation to the centerline axis of such cup; a unitary closed end wall, and an open end defined by the side wall, are at longitudinally opposite ends of the cup-shaped can body. Flange metal, that is metal oriented transversely perpendicular to the centerline axis of the cup, is provided at the open end of lighter sheet metal gage cups to insure the desired rigidity of the side wall. Cup side walls of desired rigidity enable sufficient coaction of collimating rails and of articulated elements with cup side walls to control individual cup movement and positioning for reshaping. Contact is made with a cup over an extended surface area of its height so as to avoid damage to the sheet metal or its coating.

In a specific embodiment, the sheet metal cups move from a processing line supply source onto a continuously-moving conveying surface, such as a magnetic conveyor, for collimation. The cups are oriented open-end down with individual centerline axes vertically oriented and parallel to each other in the illustrated embodiment.

In accordance with the invention, a cup is individually released from a continuous-movement conveyor and controllably transferred into a press redraw station for decreasing its diameter and increasing its side wall height, while the sequentially next cup is controlled and remaining collimated cups are held on such conveyor. Both longitudinal and transverse movement are controlled during cup travel from the supply source to registry in the press redraw station.

Collimating side rails 12, 14 of FIG. 1 present side wall contact surfaces for channeling cups into a single file as the cups are conveyed in a forward direction by a continuously-moving conveyor 15 toward a press; such forward-longitudinal-direction of movement for cups is indicated by arrow 16. Conveyor 15 can present an endless-belt cup contacting surface which moves from its cup conveying path at a location contiguous to terminating ends 17, 18 of rails 12, 14. The cup then moves on a "dead plate" with lateral guidance and control being provided by remaining articulated and stationary elements of the invention.

The press redraw station is represented by centerline axis 20; additional details of the redraw station or tooling are not required for an understanding of the cup transfer control made available by the present teachings.

Rigid side walls of cups, such as 22, are acted on by the collimating rails 12, 14 and by other interacting control parts of the invention for selective feeding and registry of cups, individually, in the redraw station. Pusher arm means 24, gate means 26, ramp means 27, and registry arms 28, 30 coact to control such cup movement; and, are disposed along the longitudinal direction of the cup travel path from termination of the collimating means to the press station.

Pusher-arm means 24 includes an elongated rail 32 having a cup-contact surface in angled relationship to the direction of movement of rail 32, at its leading edge.

Pusher-arm rail 32 is located to permit movement coextensive with a portion of cup-collimating rail 14 and, the lateral side surface of pusher arm rail 32 is coplanar with the lateral side surface of collimating rail 14. The pusher arm means 24 moves longitudinally along the collimating rail 14 and is coextensive with such portion of rail 14 when the pusher arm is fully retracted. Pusher rail 32 serves multiple functions, in cup transfer and press feed, as collimating rail 14 terminates at its forward end 18.

Pusher arm means 24 moves longitudinally only; except for conveyor surface 15 no other cup control or transfer element of the present apparatus moves along the longitudinal direction of movement of a cup.

An elongated gating means 26, seen in more detail in FIG. 2, is longitudinally stationary but pivotally mounted at axis 34. The angular movement of its opposite longitudinal ends about vertical pivot axis 34 enables its cup-entry end 36 and its cup-discharge end 38 to move transverse to the longitudinal direction of cup movement.

Gate means 26 is physically located solely on the same lateral side of the cup travel path as collimating rail 14 and pusher-arm means 24; but, its angular movement coacts with parts on the transversely opposite side of the longitudinally-directed cup travel path.

The tranversely-directed movement of portions of the gate means 26, due to angular movement about pivot axis 34, performs a gating function, as distinguished from the longitudinal and/or transverse cup movement provided by other parts with which gate means 28 coacts. Gate means 26 does provide part of a lateral-side guide function while the cup, supported on a dead plate (not shown), travels toward the redraw station after discharge from the collimating means.

Pivotal movement of gate means 26 is partially controlled by spring bias. End 38 is biased "open" as indicated schematically by spring 39 of FIG. 2. The pivotal movement of gate means 26 is further controlled by cam 40 (preferably a roller surface) carried by pusher arm means 24. The positive control exercised by cam 40 overcomes the spring bias on the elongated gate 26 during part of the cup transfer sequence.

Referring to FIG. 2, the movement of cam 40 carried by pusher arm means 24 (FIGS. 1 and 3) in relation to gate means 26 is along surfaces 42, 43, 44. Cam 40 acts at a differing level than pusher arm rail 32 as indicated by FIG. 3 which shows the relationship between pusher rail 32, cam 40 and gate means 26. The pusher arm means 24 is moved longitudinally by drive means 47 which is partially shown in FIG. 3.

Cam 40 contacts cam follower surface 42 during a portion of the time when the pusher-arm means 24 is moving toward its retracted position and during its corresponding longitudinally forward movement. Contact or movement of cam 40 along cam follower surface 42 closes or holds the gate closed; in closing such gate longitudinal end 38 of gate means 26 is moved transversely into the cup travel path to hold a cup. Forward movement of such cup is stopped when the gate is closed in this manner. As cam 40 moves from cam follower surface 42, along surfaces 43, 44, this gating function is moderated and eliminated as the spring bias on longitudinal end 38 takes over. The cup is then moved forward by angled surface 48 of the pusher arm means 24 contacting the cup during the forward movement of such pusher means.

Elongated press-entry guide and registry arms 28, 30 (FIG. 1) are longitudinally stationary but are pivotally mounted about vertical axes 50, 52, respectively, so as to provide angular movement resulting in transversely directed movement of the entry end portions of such arms. As best seen in FIG. 1, a cup-contact entry-guide surface 54 is provided along an interior side surface of arm 30; entry-guide surface 55 is similarly provided on arm 28 and contacts the diametrically opposite side wall surface of a cylindrical cup being fed into the press. Such lead-in surfaces 54, 55 extend to a configuration which defines, at least in part, a cylindrical surface having a diameter corresponding to the side wall outer diameter of the cup being fed into the press. Such cylinder defining surfaces 56, 58 on each lateral side of a cup are concentric with the centerline axis 20 of the redraw station and provide desired registry of the cup for press action.

Arms 28, 30 are spring biased so as to hold a cup (prior to reshaping) between surfaces 56, 58 and, therefore their cup-entry longitudinal ends are opened by the action of a cup side wall against lead-in surfaces 54, 55 as the cup is being controllably moved toward registry by the cup-contact surface 48 of pusher-arm means 24 moving longitudinally in the forward direction; more detailed description of this movement is presented in relation to later cycle sequence figures.

Ramp means 27 is stationary; it does not move longitudinally; nor does it pivot; but, in coaction with previously mentioned parts, it controls release of a single cup from the head of the collimated cups; and, it helps control forward and transverse movement of the released cup while helping to hold the next succeeding cup in the collimated file.

Ramp means 27, in the embodiment shown, presents ramp surfaces 60, 61 which project gradually from, and in acute angled relationship to, the lateral side plane established by collimating rail 12 to impart desired transversely directed movement without damage to a cup. Ramp means 27 also presents surface 62 which extends from such projected location in the forward direction, parallel to a centerline for the new cup travel path toward the redraw station 20. Such new travel path is offset laterally from the centerline of the cup travel path established by the collimating means 12, 14.

Coaction between ramp surface 60 and pusher arm rail surface 32 holds the collimated cups being urged forward by the conveyor 15. Later, as the lateral surface of pusher-arm rail 32 is retracted, the head cup in the collimating means is released so as to be capable of moving forward. Such head cup is then controllably moved laterally and longitudinally along ramp surfaces 60, 61 to a position to coact with the gate means 26; end 38 of the gate means 26 is closed at this point. Such gate-held cup is later controllably released and then pushed in the forward direction, longitudinally between arms 28, 30, by the angled-surface 48 at the forward end of pusher arm means 24. In interim actions, the next succeeding cup and others in the collimated line are held back by the cup in the gate means and gradually move forward as the gate held cup is moved into the registry arms 28, 30.

FIGS. 4 through 10 present a series of views, for depicting sequential movement of a cup and sequential positioning of control elements. In this series, after registry and redraw of a cup, the next cup initially held at the head of a conveyor line is controllably moved into registry in the press redraw station.

At the start of the series shown in FIG. 4, cup 70 is in registry in the press being held by cylinder-defining surfaces 56, 58. Cup 70 has been pushed in the forward direction by pusher cup-contact surface 48 and guided by the entry surfaces (54, 55 FIG. 6) of arms 28, 30 into such registry. Pusher-arm means 24 is in the forward position of its reciprocal longitudinal movement; such pusher means is driven and timed in relation to the press stroke by mechanisms, not shown in these views, the details of which are not necessary to an understanding of the invention. Upon placement within surfaces 56, 58 cup 70 is in registry for redraw and the forward direction of movement of pusher arm 24 is reversed so as to move such pusher arm means in a counter direction toward its retracted position.

Figure 5:
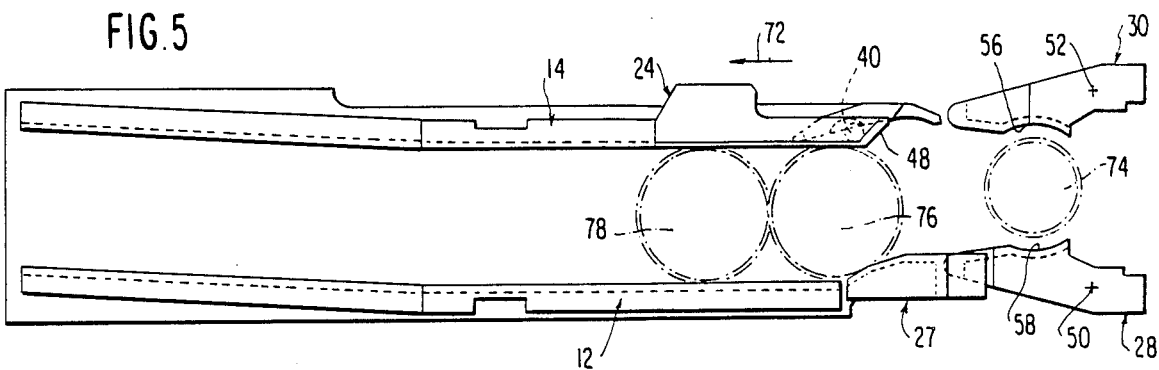

This counter-directional movement of pusher arm means 24 is indicated by arrow 72 of FIG. 5. At the head of the collimated line, cup 76 is being held between the pusher-arm rail surface 32 (FIG. 3) and the ramp surface 60 (FIG. 1). The diametric dimension of the side wall of cup 76 extends between such pusher-arm rail surface 32 and ramp entry surface 60; and, cup 76 cannot move forward at this time in the cycle.

Flange metal for cup 76 is indicated at 77 in FIG. 4.

The next succeeding cup 78 (FIG. 5) is being held back by cup 76 which also holds remaining cups (not shown) in the collimating means.

In FIGS. 4 and 5, the longitudinal end 38 of gate means 26 is full-open; being held in that position by spring biasing. However, cam 40 as shown in FIG. 5 is moving toward cam follower surface 42 as the pusher arm means 24 is being retracted in the direction indicated by arrow 72.

Figure 6:
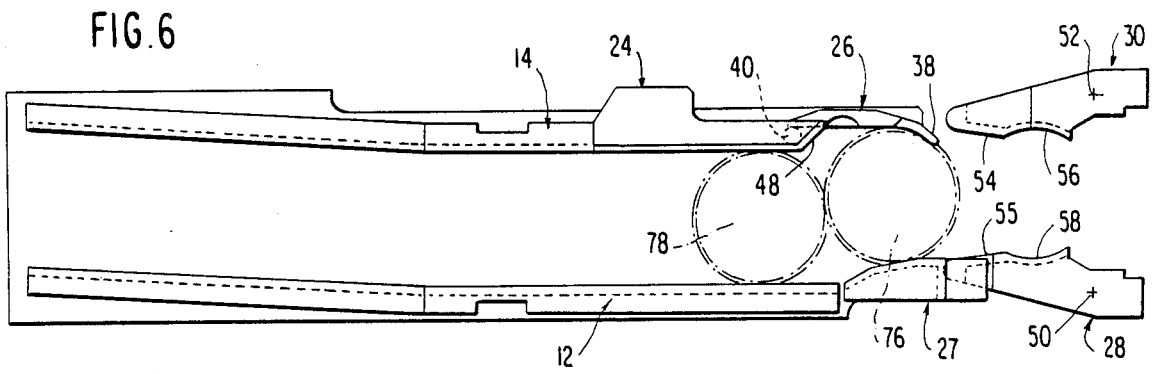

In FIG. 6, cam 40 has contacted cam follower surface 42 of gate means 26 which closes, and holds in a closed position, the longitudinal gate end 38 so as to stop cup 76 from being fed forward beyond such "gate-lock" position into the press. Cup 76 has moved along ramp surfaces 60, 61, in the transverse and longitudinal directions of cup movement, and is at the start of surface 62. Additional forward movement of cup 76 at this point is prevented by the longitudinal end 38 of gate means 26 which has been closed by contact of cam 40 with cam follower surface 42.

Figure 7:
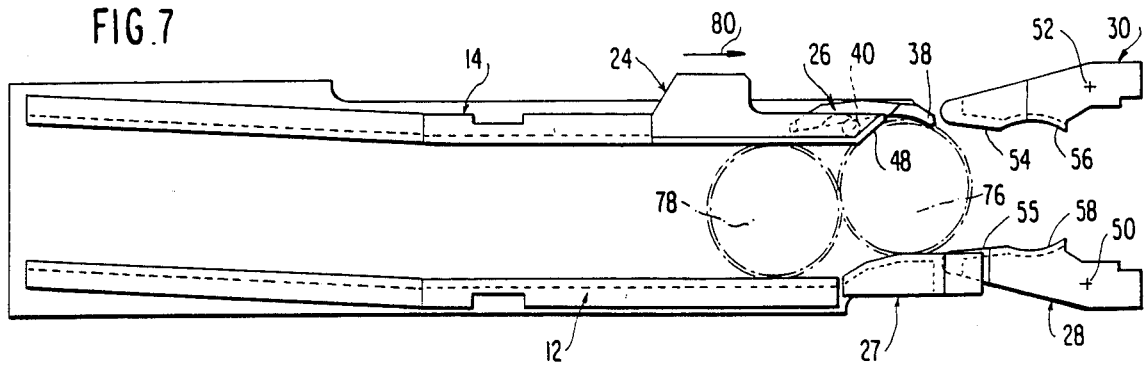
Figure 8:
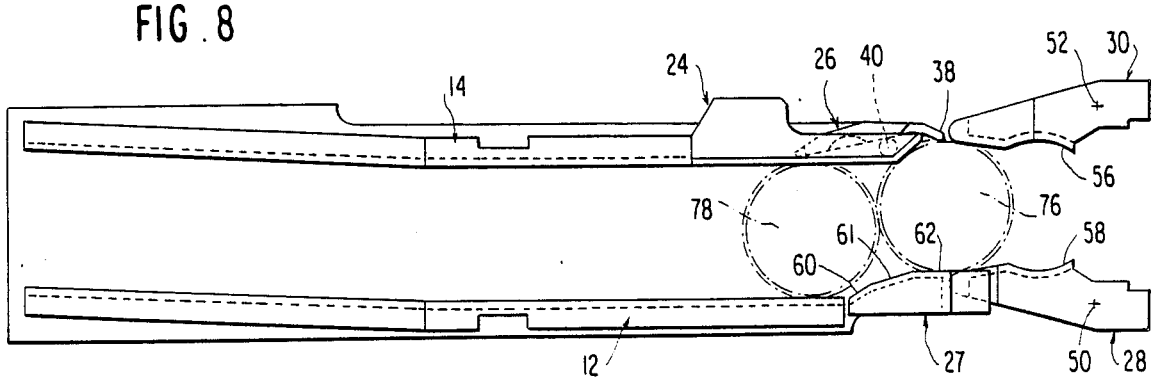
Figure 9:
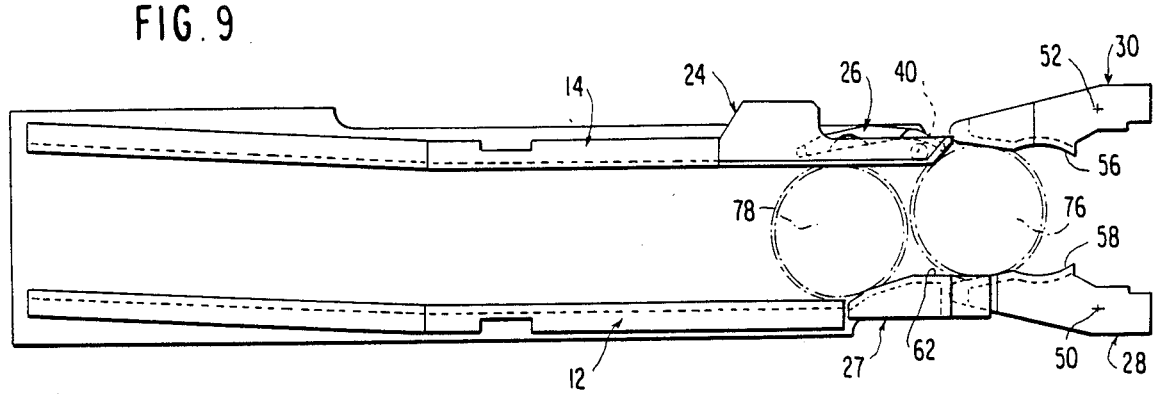

Forward movement of the next succeeding cup 78 in the collimated line is initially controlled by cup 76 as it moves first into its locked position, where it is held by gate 26 (FIG. 6), then as it moves forward as it is being released (FIG. 7) and slightly beyond into the registry arms 28, 30 (FIGS. 8, 9). As shown, cup 78 moves gradually into contact with, and is held by, ramp surface 60 (FIG. 9) when the pusher-arm means 24 has been moved in the forward direction to the position shown. These gradual, combined longitudinal and transverse movements, described in relation to cups 76, 78 provide desired control and rapid transfer while avoiding damage to sheet metal or coating.

As shown in FIG. 7, retracted movement of pusher-arm means 24 has been reversed and the pusher-arm is moving in the forward direction as indicated by arrow 80. The leading-edge angled surface 48 of pusher arm means 24 has come into contact with the side wall of cup 76. Cam 40 no longer contacts surface 42 of gate means 26 and the discharge end 38 of the gate means is being opened. Cup 76 is moved in the forward direction by the pusher means 24 as the gate means 26 is opened by spring bias; cup 78 is being moved forward gradually in the collimating means responsive to the forward movement of cup 76.

As shown in FIG. 8, cup 78 approaches but has not contacted ramp surface 60 as the gate 26 is opened. In a succeeding sequence shown in FIG. 9, cup 78 is held between such ramp surface 60 and the pusher arm rail surface 32; in that position, it will hold the head pressure of other collimated cups on the conveyor. Cup 76 is being moved along the entry-guide surfaces 54, 55 of arms 28, 30 toward registry.

Figure 10:
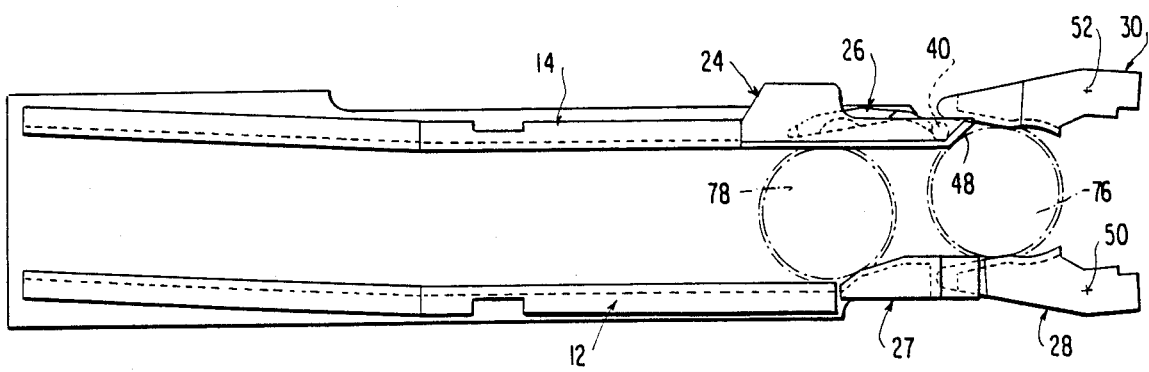

FIG. 10 shows a succeeding sequence shortly prior to the registry position described earlier in relation to cup 70 of FIG. 4. In FIG. 10, cup 76 is being moved along the lead-in surfaces 54, 55 by pusher-arm means 24 into the cylinder-defining registry surfaces 56, 58 of arms 28, 30. During such forward movement of cup 76 toward registry position, cup 78, between ramp surface 60 and pusher rail surface 32, holds its position at the head of the conveyor line.

As cup 76 moves into registry, pusher arm means 24 starts its reverse directional movement as described earlier in relation to FIG. 4 and the cup is reshaped to the configuration shown in FIG. 5 as the cycle is being repeated. Smooth, rapid transferring of cups, without damage to sheet metal or coating, is provided with minimal longitudinal movement of parts as the cup is translated in both the longitudinal and transverse directions relying on coaction between a stationary element and a pivotally articulated element.

Typical values for a specific sheet metal can body embodiment are follows:

| Sheet metal | flat rolled steel |
|---|---|
| Gage | about 65 #/bb (.007") |
| Coating | chrome - chromium oxide (TFS steel) with organic coating on both surfaces |
| Approximate Dimensions | |
| Side wall OD before redraw (cups 70, 76, 78) | 4⅞" |
| Flange metal diameter (77) | 5⅝" |
| OD after redraw (cup 74) | 3¼" |
| Transverse dimension between collimating rails 12, 14 | 4⅝" |
| Ramp surface 60 (angle with rail 12 surface and length) | 30, ½" |
| Ramp surface 61 (same) | 15, 1½" |
| Transverse dimension from collimating rail 12 to ramp surface 62 | ¾" |
| Gate means 26 | |
| Longitudinal length | 5 1/6" |
| Angular rotation | 15 |
| Pivot axis 34" location (longitudinal distance from centerline 20) | 5¾" |
| Pusher arm means 24 | |
| Longitudinal length | 8¼" |
| Longitudinal travel | 7½ |
| Diameter cam 40 | ⅝" |
| Cam 40 centerline (longitudinal distance from trailing end of pusher arm 24) | 7" |
| Registry arms 28, 30 | |
| Longitudinal length | 7" |
| Location of pivot point (distance from centerline 20) | 3¼" |
| Angular movement | 3 |

While specific materials, dimensional data and configurations have been set forth in the above description, other values and parameters can be used in the light of such disclosure; therefore, for purposes of defining the scope of this invention, reference shall be had to the appended claims.

I claim:

1. Apparatus for controlling movement of one-piece cylindrical-configuration sheet metal cups along a fabricating line into a press redraw station, comprising a supply of sheet metal cups, each having a side wall symmetrically disposed in relation to its centerline axis and a unitary closed end wall, with such side wall defining an open end longitudinally opposite to such unitary closed end wall, a conveyor means for transporting such cups, collimating means defining a single file travel path for such cups as transported by such conveyor means, such collimating means presenting a collimating rail with a cup side wall contact surface on each lateral side of such travel path, such cups being transported with their central longitudinal axes substantially parallel to each other while traveling in a forward direction toward such redraw station, such cups being of uniform side wall configuration with a rigidity enabling lateral and longitudinal movement of such cups in relation to such tavel path by acting on such cup side walls, cup registry means, located downstream of terminating ends of such collimating rail surfaces, for receiving and positioning a cup for redraw, such cup registry means including a pair of elongated registry arms each being longitudinally oriented to extend generally along such longitudinal direction of cup movement, such pair of arms being symmetrically disposed in relation to the centerline of the travel path defined therebetween for movement of cups into such redraw station, such travel path centerline passing through the central axis of such redraw station, each such registry arm having an internal surface positioned in relation to the central axis of such redraw station to define, at least in part, a cylindrical surface for receiving and holding a cup in registry with such press redraw station, such cylindrical configuration surfaces of the registry arms conforming in configuration to that of a cup side wall in a plane perpendicularly transverse to its axis prior to redraw and being in concentric relationship with the centerline axis of such redraw station, such elongated registry arms being longitudinally stationary in relation to the direction of movement of cups along such cup travel path with each arm being pivotally mounted at a location longitudinally beyond the central axis of such redraw station in the direction of cup travel to permit angular movement of remaining entry portions of such arms to open and close in a direction transverse to the longitudinal direction of movement of cups in approaching such redraw station, such elongated registry arms being spring loaded to bias such remaining entry portions of the arms in closed relationship so as to require opening for purposes of receiving a cup for longitudinal movement along entry surfaces of such arms leading to such portions defining a cylindrical configuration between such arms;

gate means for interrupting longitudinal movement of an individual cup along such cup travel path toward such redraw station, such gate means being located solely on one lateral side of such cup travel path and being longitudinally stationary while being pivotally mounted to permit angular movement of each longitudinal end of such gate means including movement of its longitudinal end disposed toward such registry arms in a direction transverse to and into such cup travel path so as to block longitudinal cup movement toward such redraw station, such gate means being spring biased to hold its longitudinal end disposed toward such elongated registry arms in an open position in relation to such cup travel path, such gate means including a cam follower surface disposed in lateral side wall relationship to such cup travel path in a position to control pivotal movement of such gate means to move such longitudinal end disposed toward such registry arms to its closed position, blocking longitudinally forward movement of a cup along such travel path to such redraw station, ramp means located only on the remaining lateral side of longitudinal cup movement opposite to such gating means, such ramp means presenting a lateral side wall ramp surface, confronting such travel path, such ramp surface projecting transversely from the lateral side wall plane of the collimating rail surface on such remaining side so as to decrease the transverse dimensional opening at the cup exit end of such collimating rail surface to enable holding a cup longitudinally stationary contiguous to the head of collimated cup between such collimating rail surfaces, pusher arm means located only on the same lateral side of such travel path as such gate means for movement between positions contiguous to such collimating means and such press redraw station, such pusher arm means including a pusher-arm rail presenting a lateral side surface which is coplanar with the lateral surface of such collimating rail located on such same side of the cup travel path as such gate means, a cup pushing surface at the leading end of such pusher-arm rail, and a cam located contiguous to the longitudinal end of such pusher arm rail which includes such cup pushing surface, such pusher-arm means being solely longitudinally movable in relation to the cup travel path established by such collimating means and having a retracted position in which such pusher arm rail surface is substantially coextensive longitudinally with a portion of such collimating rail surface and coplanar with its lateral surface when such pusher-arm means is contiguous to the discharge end of such collimating means, such pusher-arm means having an extended forward position in which such cup pushing surface moves a cup from such gate means into registry in such redraw station, such pusher-arm rail, when in its retracted position, permitting longitudinally forward movement of such cup being held contiguous to the discharge end of such collimating means and transverse movement of such cup along such ramp surface into coaction with such gate means which temporarily interrupts further forward longitudinal movement of such cup while such pusher-arm cam is in contact with such cam follower surface of the gate means to hold such longitudinal end of such gate means disposed toward such registry means in a closed position to block passage of such cup in the forward direction of the cup travel path toward such redraw station, such cup when being held by such gate means holding the next sequential cup contiguous to such discharge end of such collimating means to prevent forward movement thereof, such pusher-arm means in moving from its retracted position opening such gate means and move such cup into registry between such elongated registry arms, with such next sequential cup in such collimating means, upon release of such cup held by the gate means, moving in the forward direction of cup travel to be held between such pusher arm rail surface and the ramp means on the opposite lateral side of such cup travel path line.

2. The apparatus of claim 1 in which such conveyor means presents a horizontally-oriented surface for moving such cups open end down with their central longitudinal axes arranged in substantially vertical relationship.

3. The apparatus of claim 2 in which such longitudinal movement of cups by such conveyor surface discontinues contiguous to such discharge end of such collimating means, with continued forward movement of a cup toward such redraw station being carried out by forward movement of the remaining cups in such collimating means and by forward movement of such pusher-arm means.

4. The apparatus of claim 2 in which
such centerline of the cup travel path into such redraw station is offset laterally from the centerline of the single-file travel path established by such collimating means by an amount equal to the transverse projection of such ramp means.

5. The apparatus of claim 4 in which
such transverse projection of such ramp means is established by a ramp surface which departs in acute angled relationship from the plane of the contiguous collimating rail surface toward a surface of such ramp means which extends parallel to the centerline of the cup travel path into such redraw station.

6. The apparatus of claim 5 in which such lateral side surfaces of the cup travel path into such registry arms is established by such ramp means surface which is parallel to such cup travel path centerline and the transversely oppositely disposed gate means.

* * * * *